United States Patent [19]

Ohara et al.

[11] 4,330,791
[45] May 18, 1982

[54] SYSTEM FOR PROCESSING TELEVISION VIDEO SIGNALS REPRODUCED FROM A RECORDING MEDIUM IN SPECIAL REPRODUCTION MODE INTO SIGNALS FOR PERFORMING NORMAL INTERLACING

[75] Inventors: Terumi Ohara, Yokohama; Yoshio Mizuno, Kamakura; Yoshitaka Iwabuchi, Yamato; Kenzi Oketani, Yokohama, all of Japan

[73] Assignee: Victor Company of Japan, Ltd., Yokohama, Japan

[21] Appl. No.: 56,080

[22] Filed: Jul. 9, 1979

[30] Foreign Application Priority Data

Jul. 10, 1978 [JP] Japan .................................. 53-83786

[51] Int. Cl.³ .............................................. H04N 5/795
[52] U.S. Cl. .................................... 358/8; 358/128.6; 360/10; 360/35
[58] Field of Search .............................. 360/33, 9–10, 360/35; 358/4, 8, 128, 128.5, 128.6

[56] References Cited

U.S. PATENT DOCUMENTS

| | | | |
|---|---|---|---|
| 3,732,362 | 5/1973 | Kinjo | 360/10 |
| 3,761,604 | 9/1973 | Ozawa et al. | 360/10 |
| 3,947,870 | 3/1976 | Yumde et al. | 358/4 |
| 4,153,917 | 5/1979 | Catano et al. | 360/10 |
| 4,195,317 | 3/1980 | Stratton | 360/10 |

*Primary Examiner*—Raymond F. Cardillo, Jr.

[57] ABSTRACT

A reproduced signal processing system is employed in an apparatus for recording and reproducing a television signal on and from a rotating recording medium with one field being recorded on each track by means of at least one head. A circuit delays the signal thus reproduced by a period equal to one half of one horizontal scanning period of the television signal. A gate circuit selectively passes both the delayed reproduced signal and the delayed reproduced signal. Horizontal synchronizing signal are separated from the signal passed by the gate circuit. A standard signal supplying circuit provides a standard horizontal synchronizing signal. The phases of the separated horizontal synchronizing signal and the standard horizontal synchronizing signal are compared. Detection of coincidence or non-coincidence of the two phases forms a gate signal for so controlling the reproduced signal which has passed through the delaying circuit.

5 Claims, 8 Drawing Figures

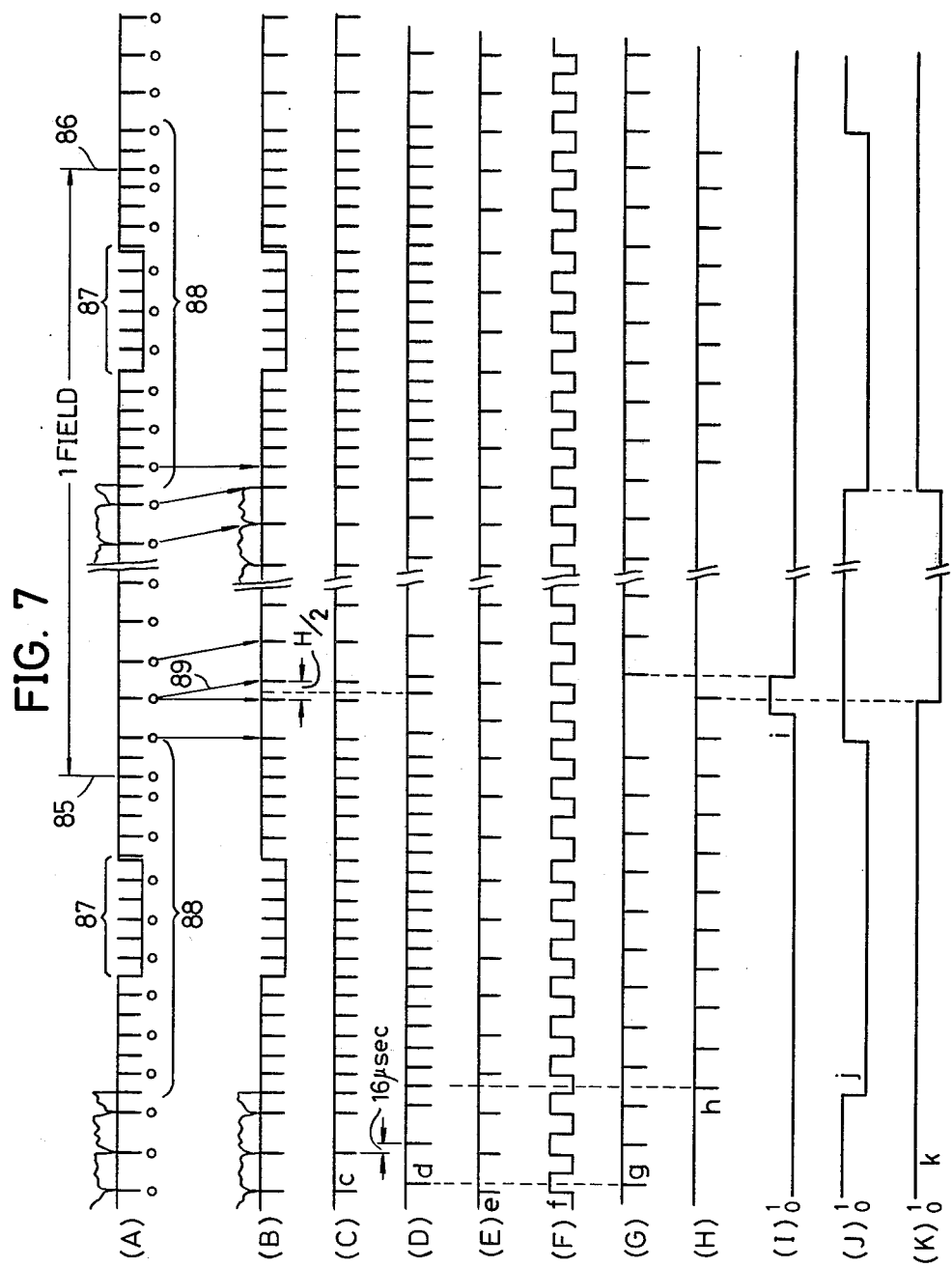

SYSTEM FOR PROCESSING TELEVISION VIDEO SIGNALS REPRODUCED FROM A RECORDING MEDIUM IN SPECIAL REPRODUCTION MODE INTO SIGNALS FOR PERFORMING NORMAL INTERLACING

BACKGROUND OF THE INVENTION

The present invention relates generally to reproduced signal processing systems in apparatus for recording and reproducing signals on and from rotating recording mediums.

More particularly, the invention relates to a system using an apparatus wherein a plurality of heads are intermittently advanced alternately over a rotating recording medium in the radial direction thereof. A television signal is recorded on and reproduced from concentric tracks on the medium. The apparatus processes the reproduced signal in a manner such that interlaced scanning can be carried out in a normal manner, even during a special mode of reproduction such as: slow-motion reproduction, quick-motion reproduction, still-picture reproduction, or reverse reproduction.

The prior art includes an apparatus wherein a plurality of magnetic heads are intermittently and alternately advanced in the radial direction over a rotating magnetic medium, such as a magnetic disc or a magnetic sheet. A television signal is alternately recorded on and reproduced from concentric tracks on the medium at a rate of one field in each one track. Recording and reproducing apparatus of this character are disclosed in the specifications of, for example, U.S. Pat. Nos. 3,649,752, 3,681,525, and 3,749,827.

In general, an interlace scanning system is adopted for a television signal. A television signal of one frame comprises an odd numbered field and an even numbered field. Then, at the time of special reproduction such as slow-motion reproduction, the advancing timing of the magnetic heads are changed and caused to differ from those during normal reproduction. Each track is reproduced a plurality of times for slow motion. For quick-motion reproduction, the recording is reproduced by skipping over one or more tracks. Or, for still-picture reproduction, the advance of the magnetic heads is stopped, and only one and the same track is reproduced a plurality of times. In a recording and reproducing apparatus of the character referred to above, the reproduced signal is not a signal in which odd number and even number fields exist, alternately with a specific relationship.

Accordingly, at the time of such special reproduction, signal processing is carried out by passing the reproduced signal through a H/2 (where H denotes one horizontal scanning period) delay circuit. By such a delay, it becomes a signal which interlaces with scanning in which odd number and even number fields alternately exist.

A known signal processing system for this purpose, identifies the magnetic head by which a signal has been reproduced and the field of that signal. The functions of the heads were set beforehand so that, for example, signals of odd number fields are recorded and reproduced by a first magnetic head, and signals of even number fields are recorded and reproduced by a second magnetic head. For this reason, it has been a practice to discriminate between recorded television signals, as to whether playback is of odd number fields or of even number fields. At the time of recording, field indication pulses are used to form track indication pulses for indicating whether either of the first and second magnetic heads is stopped and is in a state wherein it is capable of recording. Recording is carried out only when these two indication pulses coincide. During recording, if this recording operation is interrupted for a time, the track indication pulses maintain a "memory" of the state at that time. When the recording is resumed, the field indication pulses again start recording the television signal from the field coinciding with the track indication pulses.

In this known system, recording is always started from an odd number or even number field determined by the track indication pulses even in the case of special recording such as picture frame recording, insert recording, and assembly recording. For this reason, the signal is not always recorded from the field from which recording is intended. For example, in the case of a recording system wherein, with respect to an image which moves in a quick motion, a stroboscope is flashed within the vertical blanking period of the video signal for every plurality of fields. Moreover, recording may be carried out after a plurality of fields. The field immediately after the light emission of the stroboscope is not necessarily recorded in every case. In this case, the afterglow of the stroboscope is weak, and a good pickup recording cannot be carried out.

SUMMARY OF THE INVENTION

Accordingly, it is a general object of the present invention to provide a novel and useful reproduced signal processing system in an apparatus for recording and reproducing rotating recording mediums, in which system the above described problems have been overcome.

Another and specific object of the invention is to provide a system which continually identifies whether the field of a reproduced television signal is an odd number field or an even number field and so processes the reproduced signal that it becomes a field signal for carrying out normal interlaced scanning. By the use of the system of the invention, there is no necessity of causing a correspondence between the kind of field and the magnetic head in the recording system. Recording can be carried out directly from any field signal. Furthermore, in the reproducing system, signal processing can be carried out so that the resulting signal is a field signal which continually carries out normal interlaced scanning even when a special reproduction, different from ordinary reproduction, is carried out.

Still another object of the invention is to provide a system for carrying out signal processing so that, in the delaying of a signal by H/2, a delay is not caused with respect to the vertical synchronizing signal of that delayed signal. This provision of the invention prevents the occurrence of up-and-down oscillation or a shaking of the reproduced image.

Other objects and further features of the invention will be apparent from the following detailed description when read in conjunction with the accompanying drawings.

BRIEF DESCRIPTION OF THE DRAWINGS

In the drawings:

FIGS. 7(A) through 7(K) are waveform charts respectively of signals at various parts of the circuit shown in FIG. 6.

DETAILED DESCRIPTION

Figure 1:
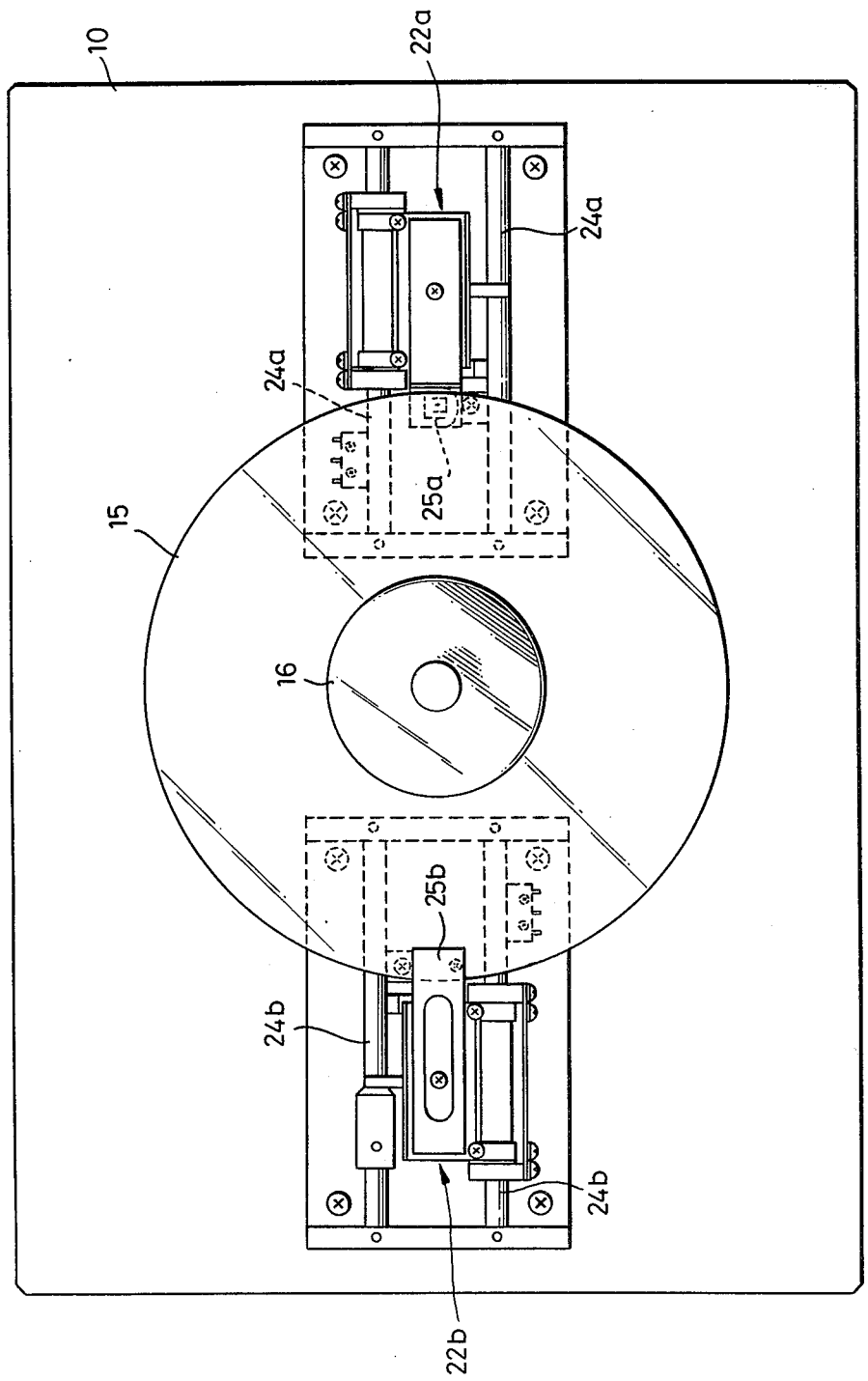
FIGS. 1 and 2 are respectively a plan view and a side-elevation of one example of a rotating recording medium recording and reproducing apparatus to which the system of the present invention can be applied.
Figure 2:
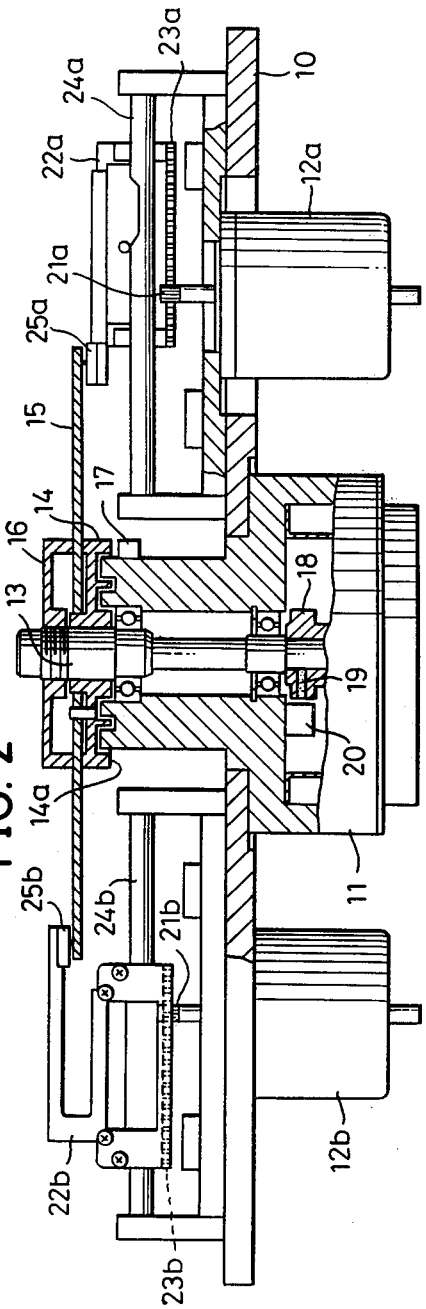

Referring first to FIGS. 1 and 2, a disc motor 11 and pulse motors 12a and 12b are mounted on the lower surface of a base plate 10. A rotating magnetic medium of disc shape (hereinafter referred to as a "disc") 15 is placed on a flange 14 fixed coaxially to the rotor shaft 13 of the disc motor 11 and is fixedly held by a clamper 16 with an accuracy expressed as less than a number of tens of $\mu$m of surface oscillation. The disc 15 has upper and lower surfaces ground to mirror surfaces, on which respective layers of magnetic material have been formed.

The disc motor 11 rotates at a rotational speed of 60 revolutions per second (rps.) in synchronism with the vertical synchronizing signal of the television signal to be recorded. The lower surface 14a of the flange 14 is coated with a magnetic material, on which is recorded a signal of twice the frequency (525 Hz per revolution) of the horizontal synchronizing signal of the television signal. This recorded signal is detected by means of a detection head 17. A wheel 18 is fixed coaxially to the disc motor rotor shaft 13 at a lower part thereof and supports a magnet 19. A detection head 20 operates cooperatively with this magnet 19 to generate one pulse for every revolution of the wheel 18.

A gear 21a is formed coaxially on the upper part of the rotor shaft of the pulse motor 12a and is meshed with a rack 23a on a head feed carriage 22a. The feed carriage 22a is guided by guide bars 24a supported horizontally and mutually parallelly above the base plate 10. A magnetic head 25a is supported on the feed carriage 22a and is fed along the radial direction of the disc 15. The feed carriage 22a is intermittently driven in a feeding movement by the intermittent rotation of the pulse motor 12a transmitted through the gear 21a and the rack 23a. During each period in which it is stopped, the magnetic head 25a carries out recording or reproducing along one of the concentric tracks on the lower surface of the disc 15.

In FIGS. 1 and 2, the pulse motor 12b, a head feed carriage 22b, and mechanism parts related thereto, are shown on the left-hand side. These parts are similar to the above described pulse motor 12a, head feed carriage 22a, and related mechanism parts shown on the right-hand side. Accordingly, like parts respectively on the left-hand and right-hand sides are designated by like reference numerals but with subscripts a and b. A detailed description of the mechanism on the left-hand side will be omitted. However, the left-hand mechanism differs from the right-hand mechanism in that the magnetic head 25b carries out recording and reproducing on and from the upper surface of the disc 15. The pulse motors 12a and 12b alternately undergo intermittent rotation.

Figure 3:
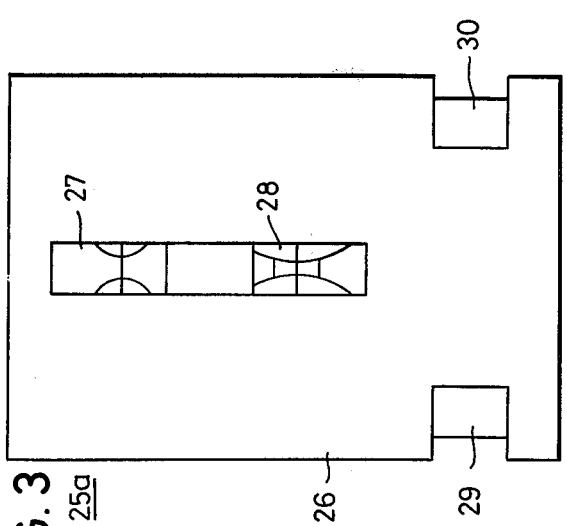
FIG. 3 is an enlarged plan view of one example of a magnetic heat part.

As illustrated in FIG. 3, the magnetic head 25a comprises a leaf spring 26, an erasing head 27 and a recording and reproducing head 28 and two dummy cores 29 and 30, provided on the leaf spring 26. The heads 27 and 28 have a positional relationship such that they trace the same track at any time on the disc 15. The magnetic head 25b has a construction similar to that of the magnetic head 25a. When the rotation of the disc 15 is stopped, the working ends of the heads 27 and 28 and the dummy cores 29 and 30 are in abutting contact with the disc surface. However, when the disc 15 is rotating, they are in a state of floatation of 0.1 to 0.2 $\mu$m away from the surface of the disc 15 due to an air film formed as a result of the rotation of the disc.

Figure 4:
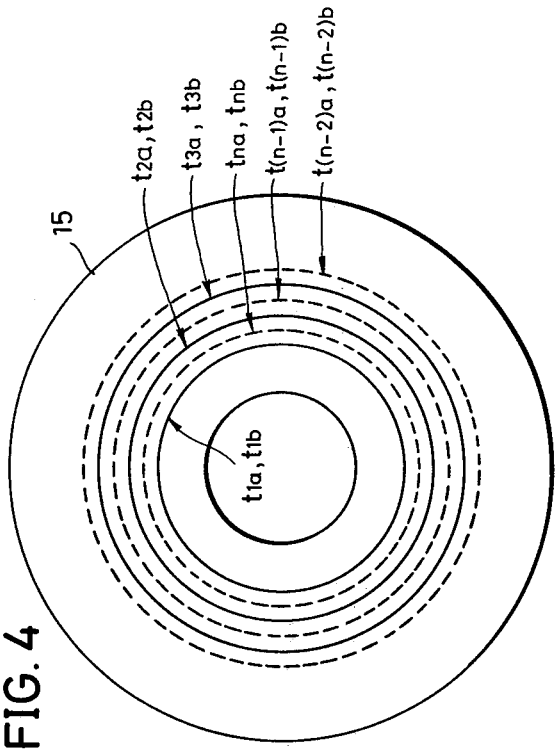
FIG. 4 is a plan view showing one example of a track pattern of a rotating magnetic disc.

In the normal recording operation, first, the magnetic head 25a is stopped, for example, and the head 28 records a television signal through one field. As recording occurs, the preceding erasing head 27 erases a previously recorded signal, along the innermost track t1a on the lower surface of the disc 15 shown in FIG. 4, during one revolution of the disc 15. Upon completion of this recording, the pulse motor 12a rotates intermittently. The magnetic head 25a moves to the succeeding track t2a and stops. While this magnetic head 25a is thus moving, the magnetic head 25b is stopped and records the television signal through the succeeding one field, along the innermost track t1b on the upper surface of the disc 15, during the succeeding one revolution thereof. Similarly thereafter, while the magnetic head 25b shifts to the succeeding track t2b, the magnetic head 25a records the television signal of the succeeding one field along the track t2a. In this alternating manner, recording is carried out successively along tracks t2b, t3a, t3b, . . . and so on.

When the magnetic heads 25a and 25b have recorded successively from the innermost to the outermost tracks of the disc 15 their advancing directions are reversed. The amounts of advance of the magnetic heads at the time of reversal are staggered by ½. Accordingly, when the magnetic heads 25a and 25b carry out recording in return paths, from the outer periphery to the innermost tracks of the disc 15, this recording is carried out along tracks represented by tracks . . . t(n-2)a, t(n-2)b. Tracks t(n-1)a, t(n-1)b, and tracks tna, tnb are indicated by broken lines and interposed between the tracks indicated by solid lines of the above described outgoing path which are recorded from the innermost track to the outer periphery of the disc 15. Subsequently, recording of one or more new signals can be carried out again from the innermost tracks to the outer periphery of the disc 15, in an endless manner, to a desired time instant by means of the magnetic heads 25a and 25b as the previously recorded signal is erased.

In the above described recording, the magnetic heads 25a and 25b may record either of the odd number and even number fields, and there is no restriction as was imposed heretofore by which the magnetic heads 25a and 25b were respectively required to record odd number (or even number) fields and even number (or odd number) fields.

One embodiment of the signal processing system according to the present invention which can be applied to the above described recording and reproducing apparatus will now be described with reference to FIG. 5 and following figures.

Figure 5:
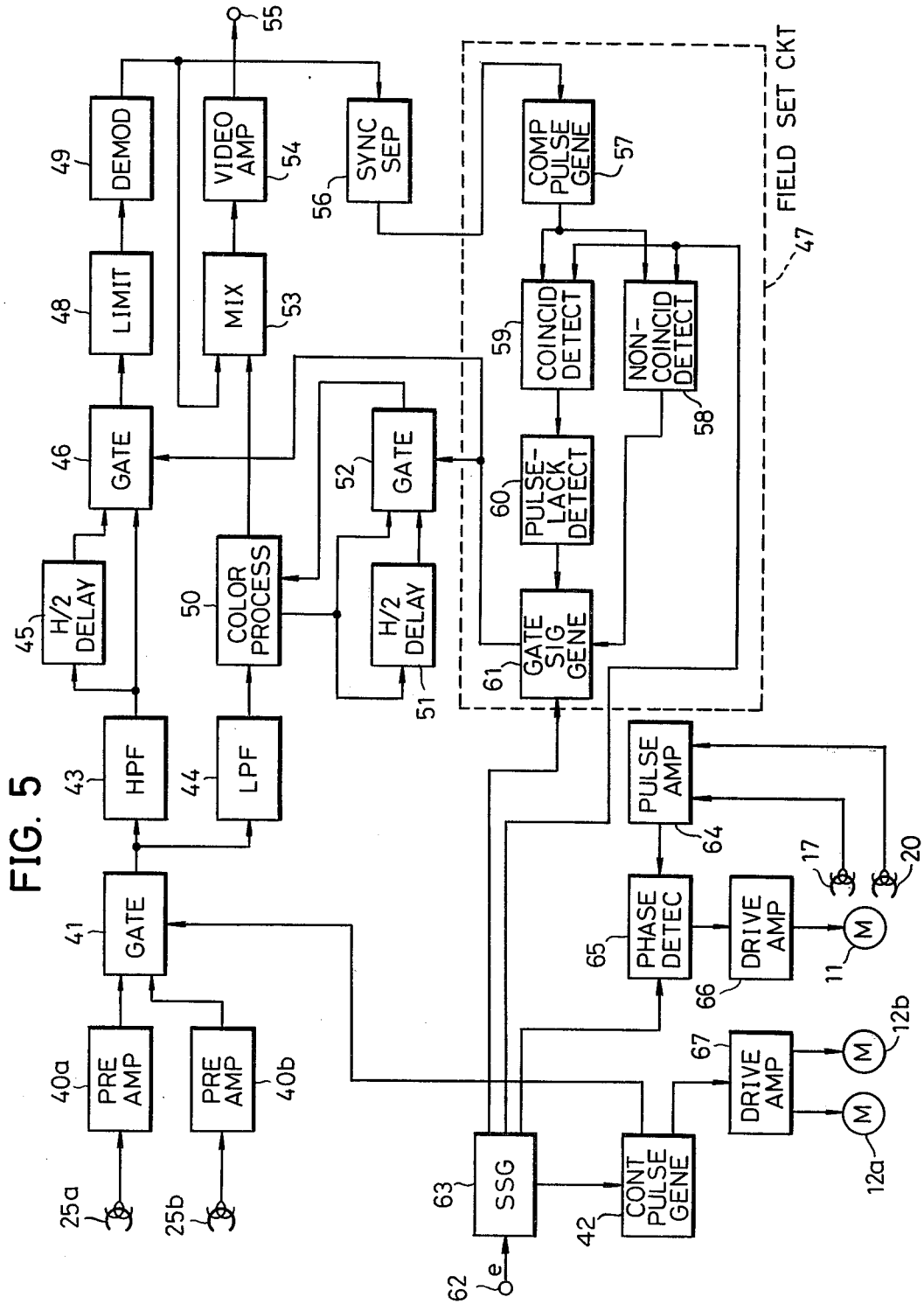
FIG. 5 is a block diagram of one embodiment of the signal processing system according to the invention.

In the system shown in FIG. 5, the color television signals reproduced alternately from the disc 15 by the magnetic heads 25a and 25b are respectively fed through preamplifiers 40a and 40b to a gate circuit 41, where they are alternately gated by a signal from a control pulse generator 42 and thereby formed into a single, continuous reproduced signal. This reproduced signal is supplied to a high-pass filter 43 and a low-pass filter 44 and thereby separated respectively into a luminance signal component and a carrier chrominance signal component.

The luminance signal component which is thus separated is fed, on one hand, directly to a gate circuit 46 and, on the other hand, through a ½ horizontal scanning period (H/2) delay circuit 45, thereby being delayed H/2, to the gate circuit 46. The luminance signal thus fed via the two paths to the gate circuit 46 is therein gated by a signal from a field setter circuit 47 constituting an essential part of the system of the present invention, which is described hereinafter. The waveform of the gated output signal of the gate circuit 46 is shaped by a limiter 48 and demodulated in a demodulator 49.

The above mentioned separated carrier chrominance signal component is fed to a color processing amplifier 50, where it is frequency converted to 3.58 MHz and is then supplied to a mixer 53. At the same time, the separated chrominance signal is supplied from the color processing amplifier 50 directly, and also via a H/2 delay circuit 51, to a gate circuit 52, where it is gated by the signal from the field setter circuit 47. The demodulated luminance signal from the demodulator 49 and the frequency-converted carrier chrominance signal from the color processing amplifier 50 are mixed in a mixer 53. The resulting signal is passed through a video amplifier and led out as a reproduced NTSC system color television signal, through an output terminal 55. In general, it is difficult for a H/2 delay circuit to uniformly effect an H/2 delay over the entire wide band of a color television signal. In the system of the present invention, however, the television signal is separated into a luminance signal component and a carrier chrominance signal component. An H/2 delay is effected with respect to each of these components. As a result, delaying can be carried out in an excellent manner.

The demodulated luminance signal from the demodulator 49 is also supplied to a synchronizing signal separation circuit 56, where the horizontal synchronizing signal is separated. This horizontal synchronizing signal is fed to a comparison pulse generator 57 within the field setter circuit 47, where it is formed into comparison pulses corresponding to this horizontal synchronizing signal. These comparison pulses are supplied to a non-coincidence detection circuit 58 and to a coincidence detection circuit 59.

On the other hand, a horizontal synchronizing signal supplied from the outside through a terminal 62 or an oscillation horizontal synchronizing originating within the system is supplied to a standard signal generator 63. In the standard signal generator 63, a signal synchronized with the horizontal synchronizing signal thus supplied and having a frequency which is twice that of the horizontal synchronizing signal is generated and further counted down, to form a signal of a duty ratio of 50 percent, synchronized with the horizontal synchronizing signal. This signal is supplied to the above mentioned non-coincidence detection signal 58 and to the coincidence detection signal 59.

When the phases of the signal from the comparison pulse generator 57 and the signal from the standard signal generator 63 are not coincident, a signal is outputed from the non-coincidence detection circuit 58. Whereas when these two signals are coincident, a signal is outputed from the coincidence detection circuit 59. The output signal of the non-coincidence detection circuit 59 is supplied directly to a gate signal generator 61. The output signal of the coincidence detection circuit 59 is supplied to a pulse-lacking detection circuit 60. There, it is prevented from causing erroneous operation due, for example, to a dropout. Then, it is supplied to the gate signal generator 61. The gate signal generator 61 produces an output gate signal for controlling the aforementioned gate circuit 46 so that it will pass the signal which has passed through the H/2 delay circuit 45 when there is an output from the non-coincidence detection circuit 58 and so that the gate circuit 46 will directly pass the signal sent directly from the high-pass filter 43 without passing through the H/2 delay circuit 45. The above mentioned field setter circuit 47 will be described hereinafter in greater detail.

A signal is led out from the head 20 at a rate of one signal per revolution of the disc motor 11, that is, of the disc 15. This signal is passed through a pulse amplifier 64 and fed to a phase comparator 65, where its phase is compared with that of the vertical synchronizing signal of the television signal from the standard signal generator 63. The resulting phase comparison error output of the phase comparator 65 is sent through a drive amplifier 66 to control the disc motor 11. After the rotation of the disc motor 11 is locked with the phase of the vertical synchronizing signal, the signal from the head 17 is ½ frequency divided. Thereafter, its phase is compared by the phase comparator 65 with that of the horizontal synchronizing signal from the standard signal generator 63. The rotation of the disc motor 11 is thus controlled by the resulting phase comparison error output of the phase comparator 65 through the drive amplifier 66. The signal from the standard signal generator 63 is also fed to the aforementioned control pulse generator 42, which thereupon sends an output signal by way of a drive amplifier 67 to drive control the pulse motors 12a and 12b.

Figure 6:
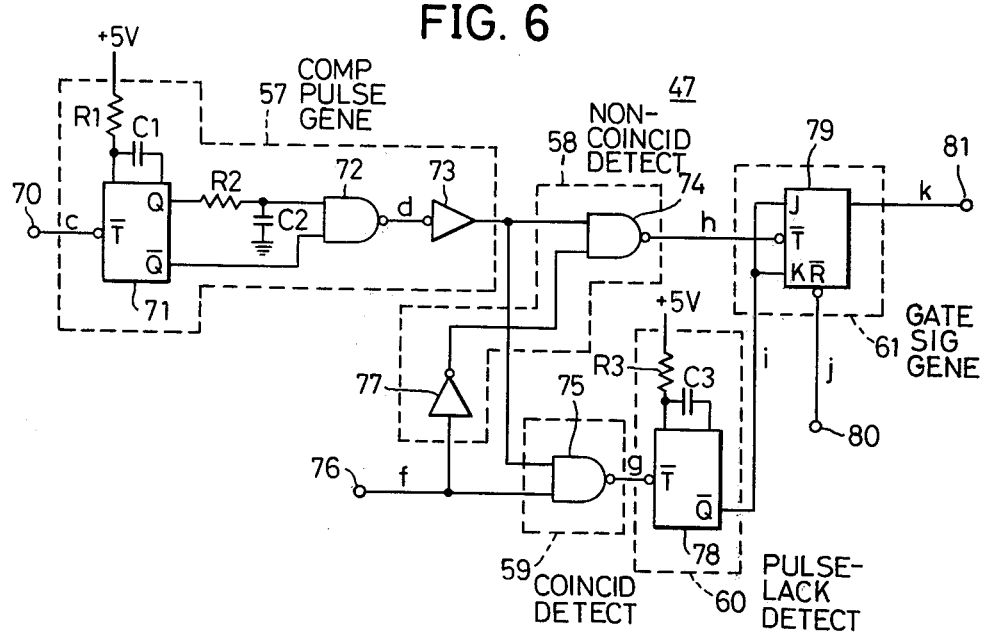
FIG. 6 is a circuit diagram of one embodiment of a specific circuit in concrete form of an essential part of the block diagram illustrated in FIG. 5.

Next, one embodiment of a specific circuit of the field setter circuit 47 will be described in conjunction with FIG. 6. In FIG. 6, those parts which are the same as corresponding parts in FIG. 5 are designated by like reference numerals.

The horizontal synchronizing signal c of the waveform shown in FIG. 7(C), has been separated by the synchronizing signal separation circuit 56 shown in FIG. 5 as described. Signal c is applied to an input terminal 70 of the circuit shown in FIG. 6 and triggers a monostable multivibrator 71. The pulse width of the oscillation output of this monostable multivibrator 71 is set at H/4 ($\approx 16$ μsec.) by the time constant determined by the resistance and capacitance values of a resistor R1 and a capacitor C1. The oscillation output Q of this monostable multivibrator 71 is supplied through an integration circuit comprising a resistor R2 and a capacitor C2 to one of the input terminals of a NAND gate 72, while the oscillation output $\overline{Q}$ is supplied directly to the other input terminal of the NAND gate 72. From this NAND gate 72 is led out a delayed horizontal synchronizing signal d as indicated in FIG. 7(D), which is delayed by 16 μsec. from the leading edge of the horizontal synchronizing signal c. The signal d is passed through an inverter 73, where its polarity is inverted. Thereafter, it is applied to one of the input terminals of each of NAND gates 74 and 75.

On the other hand, a horizontal synchronizing signal e as indicated in FIG. 7(E), has been applied through the input terminal 62 of the system illustrated in FIG. 5. Signal e is fed to the standard signal generator 63, where its frequency is doubled, is counted down, and formed into a signal f of rectangular waveform with a 50-percent duty ratio as indicated in FIG. 7(F). This signal f from the standard signal generator 63 is applied as a gate signal to a terminal 76 of the circuit shown in FIG. 6. This signal f is applied to the other input terminal of the NAND gate 75. After its polarity has been inverted by an inverter 77, it is applied to the other input terminal of the NAND gate 74.

The NAND gate 75 passes the pulses from the inverter 73 during a high-level period of the gate signal f. Consequently, pulses g as indicated in FIG. 7(G) are led out from this NAND gate 75. The purpose of delaying by H/4 the output of the monostable multivibrator 71 is to cause the output signal of the inverter 73 to be positioned at substantially the middle of the high-level period of the gating signal f at the NAND gate 75 at the time of phase comparison.

The pulses g are applied to the trigger terminal T of a retriggerable monostable multivibrator 78 whose delay time is set at 1H period or more by a time constant determined by the resistance and capacitance values of a resistor R3 and a capacitor C3. The pulses g are applied with a period of 1H to the trigger terminal T of the monostable multivibrator 78 when the horizontal synchronizing signal f from the outside and the reproduced horizontal synchronizing signal c are of the same phase. For this reason, the $\overline{Q}$ output of the monostable multivibrator 78 assumes a low level. When the pulses g are interrupted, the $\overline{Q}$ output assumes a high level, at which it is held, but it assumes the low level when the pulses g are again applied. Accordingly, a signal i as indicated in FIG. 7(I) is led out from the monostable multivibrator 78 and is applied as input to J-and K-terminals of a J-K flip-flop 79.

The NAND gate 74 outputs the pulses from the inverter 73 within the high-level period of the signal from the inverter 77, that is, the low-level period of the above mentioned gating signal f. These output pulses h as indicated in FIG. 7(H) of the NAND gate 74 are applied to the trigger terminal $\overline{T}$ of the J-K flip-flop 79.

In general a J-K flip-flop has a characteristic whereby its output is varied by trigger pulses when the input levels of the J-and K-terminals thereof are of a high level. Accordingly, the signal i applied to the J- and K-terminals of the J-K flip-flop 79 is of a high level when the above mentioned pulses h are applied to the trigger terminal $\overline{T}$ with the phases of the reproduced horizontal synchronizing signal and the horizontal synchronizing signal from the outside in staggered state. Then, the output K is indicated in FIG. 7(K) of the J-K flip-flop 79 as being inverted and changed from a high level to a low level.

Furthermore, a vertical blanking signal j as indicated in FIG. 7(J) corresponds to the vertical blanking period of the television signal. This signal is applied from the standard signal generator 63 through a terminal 80 to the reset terminal $\overline{R}$ of the J-K flip-flop 79, which is thereby reset. As a consequence, the output signal k of the J-K flip-flop 79 changes from a low level to a high level, becoming a signal of the waveform indicated in FIG. 7(K) as a result. This signal k is let out through a terminal 81 and is supplied as a gate signal to the gate circuits 46 and 52 of the system shown in FIG. 5. When the applied gate signal k is of a high level, the gate circuits 46 and 52 respectively pass the signals from the high-pass filter 43 and the color processing circuit 50. When the gate signal k is of a low level, the gate circuits 46 and 52 respectively pass the signals from the H/2 delay circuits 45 and 51.

One embodiment of a specific circuit for the gate circuit 46 is described with reference to FIG. 8. Since the gate circuit 52 also has a similar circuit, a description of it will be omitted.

Figure 8:
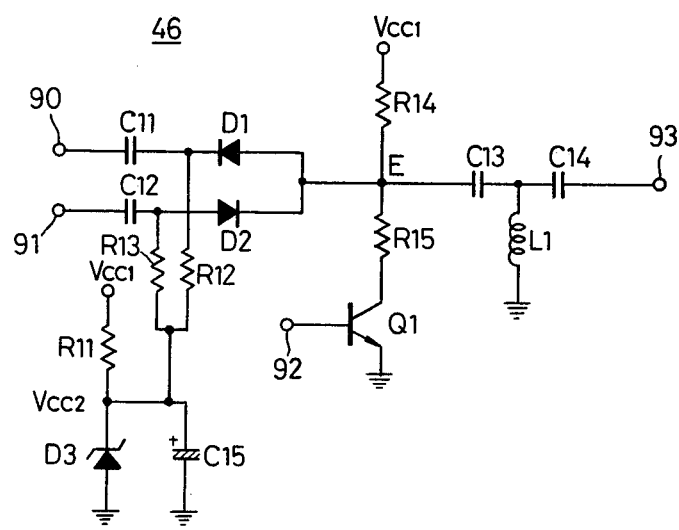
FIG. 8 is a circuit diagram of one embodiment of a gate circuit in the block diagram shown in FIG. 6.

The aforedescribed output signals from the H/2 delay circuit 45 and the high-pass filter 43 are applied to input terminals 90 and 91 of the gate circuit 46 illustrated in FIG. 8. The above mentioned gate signal k from the terminal 81 is applied through a terminal 92 to the base of a transistor Q1. The input terminals 90 and 91 are respectively connected through capacitors C11 and C12 to oppositely poled diodes D1 and D2. The input sides of the diodes D1 and D2 are respectively connected through resistors R12 and R13 to a circuit of a second power source voltage Vcc2 comprising a Zener diode D3, a resistor R11, and a capacitor C15. The output sides of the diodes D1 and D2 are commonly connected to a junction point E, which is connected through a resistor R15 to the collector of the transistor Q1.

When the transistor Q1 is in its conductive state, due to the gate signal k, the voltage at the junction point E becomes amply lower than the voltage Vcc2. The diode D2 is biased in the forward direction and becomes conductive, while the diode D1 is biased in the reverse direction and is cut-off. When the transistor Q1 is caused by the gate signal k to be nonconductive, the voltage of the junction point E is voltage divided by the resistor R12 and a resistor R14 and becomes amply higher than the voltage Vcc2. The diode D1 becomes conductive, while the diode D2 is biased in the reverse direction and cut-off. Consequently, when the transistor Q1 is conductive, the signal applied to the input terminal 91 is obtained at the junction point E. When the transistor Q1 is nonconductive, the signal applied to the input terminal 90 is obtained at the junction point E. The signal thus obtained at the junction point E is passed through a high-pass filter comprising capacitors C13 and C14 and an inductor L1, where its DC component and transient noises at the time of switching are removed. The resulting signal is led out through an output terminal 93.

Then, in still-picture reproduction, for example, the disc 15 is rotated at a speed of 60 rps., and the advances of the magnetic heads 25a and 25b are stopped. The signal of the same track (i.e., the signal of the same field) is repeatedly reproduced from only one of the magnetic heads 25a and 25b and is continuously supplied to the high-pass filter 43 and the low-pass filter 44.

The waveform of a reproduced television signal which has not been subjected to a signal processing of H/2 delay is as indicated in FIG. 7(A). This FIG. 7(A), however, indicates the waveform in the demodulated state. In FIG. 7(A), reference numeral 85 designates the position at which the reproduction (recording) of one track starts. Reference numeral 86 designates the position at which the reproduction (recording ends. The interval between the positions 85 and 86 corresponds to one field period. By repeated reproduction of one and the same track, the television signal of one field is repeatedly and continuously reproduced. On one track of the disc 15, the signal positions 85 and 86 are one and the same position. In order to clearly indicate the position of the horizontal synchronizing signal in FIG. 7(A), circular marks are placed at the ends of the horizontal synchronizing signal. The period designated by the reference numeral 87 is the vertical synchronizing period. The period designated by the reference numeral 88 is a period in which equalizing pulses exist. The starting and ending positions 85 and 86 of recording or reproducing, that is, the switching point positions of the field signal, are set within the equalizing pulse periods 88 and after the vertical synchronizing signal 87 because it is desirable to prevent the switching points from appearing in the reproduced picture and from being present in the vertical synchronizing signal 87, in order to prevent disturbance of the vertical synchronization.

In still picture reproduction, only one and the same field of odd number (or even number) is repeatedly reproduced. If the resulting reproduced signal were to be supplied, as it is, directly to a television receiver which carries out interlaced scanning, two superposed images of, respectively, staggered images and not staggered images (by the H/2 period) would be formed in the horizontal direction on the reproduced picture. In accordance with the system of the present invention, however, this problem does not arise since signals delayed by the H/2 period are used alternately, as described hereinbefore.

When the phase of the pulses f of a phase equal to that of the horizontal synchronizing signal of a television signal of a normal NTSC system are formed from an outside synchronizing signal, the phase of the reproduced horizontal synchronizing signal may lose coincidence. This non-coincidence is detected by the non-coincidence detection circuit 58 comprising the NAND gate 74 and the inverter 77. In the period from the pulse h arrival, immediately after this detection of non-coincidence, to the instant immediately before the arrival of an equalizing pulse in front of the vertical synchronizing signal of that field (that is, in the period of low level of a the gate signal k) signals delayed by the H/2 period in the H/2 delay circuits 45 and 51 are output from the gate circuits 46 and 52. In the periods other than that mentioned above, signals which have not been delayed by the H/2 delay period from the high-pass filter 43 and the color processing circuit 50 are passed by the gate circuits 46 and 52.

The waveform of a signal which has been subjected to the H/2 period delay processing is indicated in FIG. 7(B). Since the signal of FIG. 7(B) is delayed by the H/2 period (relative to the signal of FIG. 7(A)), an image resulting from an excellent interlaced scanning is reproduced by alternately obtaining the signals of FIGS. 7(A) and 7(B) and feeding them into a television receiver. The horizontal synchronizing signal c which is phase compared is obtained from the signal of FIG. 7(B). It is not subjected to H/2 delay processing in the initial one horizontal scanning period but is processed as indicated by line 89 from the succeeding horizontal synchronizing signal. However, since only a single horizontal scanning line is not thus processed by H/2 delaying, and, moreover, since this occurs at an upper edge position of the reproduced picture, no adverse effect whatsoever is produced in actual practice.

In the H/2 delay processing by the H/2 delay circuits 45 and 51, the signals also including the vertical synchronizing signal of the signal of one field are delayed by H/2. The reproduced image oscillates up and down every other field. In the system of the present invention, however, the gate signal k is obtained through the use of the signals h,i, and j as described hereinbefore. The vertical synchronizing signal 87 of the field signal delayed by H/2 and the equalizing pulse period 88 are not delayed. For this reason, the up-and-down oscillation of the reproduced image does not occur.

The above description relates to still-picture reproduction. It is possible, of course, by the use of the reproduced signal processing system of the present invention, to also carry out signal processing to similarly interlace scanning of reproduction of tracks which have been recorded by special methods such as picture frame recording, insert recording, and assembly recording, in addition to special reproduction such as slow-motion reproduction wherein the tracks are successively reproduced. Each track is reproduced a plurality of times before the succeeding track is reproduced for slow-motion-Quick-motion reproduction is carried out by skipping one or more tracks. Reverse reproduction is carried out in the sequence which is reverse to the recording sequence. Furthermore, in the above description, the recorded and reproduced signal is a television signal of the NTSC system. The present invention is also applicable to television signals of other systems such as the PAL system. Further, the invention is not limited to color television signals but can be applied also to monochrome television signals.

Thus, in accordance with the system of the present invention, there is no necessity of the magnetic heads 25a and 26a respectively setting the kind (odd number of even number) of the field to be recorded as in the prior art.

Further, this invention is not limited to these embodiments but various variations and modifications may be made without departing from the scope of the invention.

What is claimed is:

1. A reproducing system in an apparatus having one head for recording and reproducing a television signal on and from a rotating recording medium, with one field recorded on each track on the medium, said system comprising:
   means for delaying a signal reproduced from a track by a period equal to one half of one horizontal scanning period of the television signal;
   gate means for selectively passing a reproduced signal from the delaying means and a reproduced signal which has not passed through the delaying means;
   means for separating a horizontal synchronizing signal from the signal passed by the gate means;
   means for supplying a standard reference signal;
   phase detection means for comparing the phase of the separated horizontal synchronizing signal with the phase of the standard reference signal and detecting a coincidence or non-coincidence of the two phases in order to produce a corresponding detection output signal; and
   gate signal forming means responsive to the detection output signal of the phase detection means for forming a gate signal for controlling the gate means upon non-coincidence detection, the reproduced signal from the delaying means passing through the gate means during substantially a video signal period of a field during which the non-coincidence is detected, and the reproduced signal which has not passed through the delaying means passing through the gate means during a period when coincidence is detected.

2. The reproduced signal processing system as claimed in claim 1 in which the gate signal forming means forms a gate signal which controls the gate means so that the gate means operates during video signal periods other than periods of the vertical synchronizing signals and equalizing pulses of fields in which the non-coincidence is detected, said gate then passing reproduced signals which do not pass through the delaying means.

3. A reproduced signal processing system as claimed in claim 1 in which: the television signal is a color television signal; means for separating the reproduced color television signal into a luminance signal component and a carrier chrominance signal is further provided; the delaying means comprises first and second delay circuits for delaying the thus separated luminance signal component and carrier chrominance signal component respectively by one half of the horizontal scanning period; and the gate means comprises a first gate circuit for selectively passing the luminance signal component which has passed through the first delay circuit and the luminance signal component which has not passed through the first delay circuit and a second gate circuit for selectively passing the carrier chrominance signal component which has passed through the second delay circuit and the carrier chrominance signal component which has not passed through the second delay circuit.

4. A reproducing system in an apparatus having one head for recording and reproducing a television signal on and from a rotating recording medium, with one field recorded on each track on the medium, said system comprising:

means for delaying a signal reproduced from a track by a period equal to one half of one horizontal scanning period of the television signal;

gate means for selectively passing a reproduced signal from the delaying means and a reproduced signal which has not passed through the delaying means;

means for separating a horizontal synchronizing signal from the signal passed by the gate means;

means for supplying a standard reference signal;

phase detection means for comparing the phase of the separated horizontal synchronizing signal with the phase of the standard reference signal and detecting a coincidence or non-coincidence of the two phases in order to produce a corresponding detection output signal; and gate signal forming means responsive to the detection output signal of the phase detection means for forming a gate signal for controlling the gate means upon non-coincidence detection, the reproduced signal from the delaying means passing through the gate means during substantially a video signal period of a field during which the non-coincidence is detected, the reproduced signal which has not passed through the delaying means passing through the gate means during a period when coincidence is detected, the gate signal forming means forming a gate signal which controls the gate means so that the gate means operates during video signal periods other than periods of the vertical synchronizing signals and equalizing pulses of fields in which the non-coincidence is detected, said gate then passing reproduced signals which do not pass through the delaying means, the phase detection means comprising a coincidence detection circuit means and a non-coincidence detection circuit means for respectively comparing the phase of the separated horizontal synchronizing signal with the phase of the standard reference signal and for producing a corresponding detection output responsive to a detection of coincidence or non-coincidence of the phases, the gate signal forming means comprising a pulse-lacking detection circuit means connected to the output side of the coincidence detection circuit means for preventing an inversion of the gate signal due to lack of the reproduced signal, and gate signal generating circuit means for forming the gate signals jointly responsive to output signals of the coincidence detection circuit means and responsive to the pulse lacking detection circuit means.

5. The reproduced signal processing system as claimed in claim 4 which further comprises means for delaying the separated horizontal synchronizing signal by approximately a H/4 period, and in which: the standard reference signal supplying means supplies a standard reference signal for comparison of a duty ratio of approximately 50 percent at the horizontal synchronizing signal frequency with a standard blanking signal which varies in response to changes between the vertical blanking period and a video signal period other than the vertical blanking period; the coincidence detection circuit means comprising a first gate circuit means responsive to the standard reference signal for gating, with respect to the delayed horizontal synchronizing signal, a phase coincident with that of the standard reference signal; the non-coincident detection circuit means comprising a second gate circuit means responsive to the standard reference signal for gating with respect to the delayed horizontal synchronizing signal a phase which is not coinciding with the phase of the standard reference signal; the pulse-lacking detection circuit means comprising a retriggerable monostable multivibrator for producing an output which is inverted responsive to an absence of the output of the first gate circuit means and is again inverted by a succeeding output of the first gate circuit means to return to the original state; and the gate signal generating circuit means comprising a J-K flip-flop circuit supplied at a trigger terminal thereof with the output of the second gate circuit, at J- and K- terminals thereof with the output of the retriggerable monostable multivibrator, and at a reset terminal thereof with a standard blanking signal for producing a gate signal.

* * * * *